United States Patent
Stone et al.

(10) Patent No.: US 9,284,803 B2
(45) Date of Patent: Mar. 15, 2016

(54) ONE-WAY FLOWABLE ANCHORING SYSTEM AND METHOD OF TREATING AND PRODUCING A WELL

(71) Applicants: Patrick C. Stone, Cypress, TX (US); Douglas J. Lehr, The Woodlands, CT (US); Gregory Lee Hern, Porter, TX (US); Levi B. Oberg, Houston, TX (US); Jim H. Roddy, Houston, TX (US)

(72) Inventors: Patrick C. Stone, Cypress, TX (US); Douglas J. Lehr, The Woodlands, CT (US); Gregory Lee Hern, Porter, TX (US); Levi B. Oberg, Houston, TX (US); Jim H. Roddy, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 455 days.

(21) Appl. No.: 13/839,365

(22) Filed: Mar. 15, 2013

(65) Prior Publication Data

US 2013/0206409 A1    Aug. 15, 2013

Related U.S. Application Data

(63) Continuation-in-part of application No. 13/705,972, filed on Dec. 5, 2012, which is a continuation-in-part of application No. 13/358,307, filed on Jan. 25, 2012, now Pat. No. 9,033,060.

(51) Int. Cl.
*E21B 33/134* (2006.01)
*E21B 33/124* (2006.01)
*E21B 23/01* (2006.01)
*E21B 43/26* (2006.01)
*E21B 23/00* (2006.01)
*E21B 41/00* (2006.01)

(52) U.S. Cl.
CPC ............... *E21B 23/01* (2013.01); *E21B 23/00* (2013.01); *E21B 33/124* (2013.01); *E21B 33/134* (2013.01); *E21B 41/0064* (2013.01); *E21B 43/261* (2013.01); *Y02C 10/14* (2013.01)

(58) Field of Classification Search
CPC ... E21B 33/134; E21B 33/124; E21B 33/128; E21B 33/1285; E21B 33/1294; E21B 33/122; E21B 33/129
See application file for complete search history.

(56) References Cited

U.S. PATENT DOCUMENTS

| 2,189,697 A | 2/1940 | Baker |
| 2,222,233 A | 11/1940 | Mize |
| 2,225,143 A | 12/1940 | Baker et al. |
| 2,672,199 A | 3/1948 | McKenna |

(Continued)

OTHER PUBLICATIONS

Quik Drill Composite Frac Plug; Baker Hughes, Baker Oil Tools; Copyright 2002; 3 pages.

(Continued)

*Primary Examiner* — Giovanna C Wright
(74) *Attorney, Agent, or Firm* — Cantor Colburn LLP

(57) ABSTRACT

A one-way flowable anchoring system includes a plurality of same anchors that are sealedly fixedly engagable within a structure and each of the plurality of same anchors has a flow bore longitudinally therethrough with a first seat and a second seat on opposing ends thereof The system also has a plug positionable within the structure between two of the plurality of same anchors positioned longitudinally adjacent one another. The plug is sealedly engagable to substantially block flow through the flow bore of a first of the plurality of same anchors when sealingly engaged with the first seat thereof and the plug is seatingly engagable to allow flow around the plug and into the flow bore of the second of the plurality of same anchors through an area at least equal to that of the flow bore when the plug is seated at the second seat thereof

20 Claims, 14 Drawing Sheets

(56) References Cited

U.S. PATENT DOCUMENTS

| | | | |
|---|---|---|---|
| 2,753,941 | A | 7/1956 | Hebard et al. |
| 2,933,136 | A | 4/1960 | Ayers et al. |
| 3,142,338 | A | 7/1964 | Brown |
| 3,602,305 | A | 8/1971 | Kisling |
| 4,284,137 | A | 8/1981 | Taylor |
| 4,524,825 | A | 6/1985 | Fore |
| 4,719,971 | A | 1/1988 | Owens |
| 4,784,226 | A | 11/1988 | Wyatt |
| 4,901,794 | A | 2/1990 | Baugh et al. |
| 5,511,620 | A | 4/1996 | Baugh et al. |
| 6,354,372 | B1 | 3/2002 | Carisella et al. |
| 6,394,180 | B1 | 5/2002 | Berscheidt et al. |
| 6,446,717 | B1 | 9/2002 | White et al. |
| 6,513,600 | B2 | 2/2003 | Ross |
| 6,712,153 | B2 | 3/2004 | Turley et al. |
| 6,712,797 | B1 | 3/2004 | Southern, Jr. |
| 6,769,491 | B2 | 8/2004 | Zimmerman et al. |
| 7,128,145 | B2 | 10/2006 | Mickey |
| 7,165,622 | B2 | 1/2007 | Hirth et al. |
| 7,168,494 | B2 | 1/2007 | Starr et al. |
| 7,210,533 | B2 | 5/2007 | Starr et al. |
| 7,350,582 | B2 | 4/2008 | McKeachnie et al. |
| 7,607,476 | B2 | 10/2009 | Tom et al. |
| 7,743,836 | B2 | 6/2010 | Cook et al. |
| 7,798,236 | B2 | 9/2010 | McKeachnie et al. |
| 8,459,347 | B2 | 6/2013 | Stout |
| 8,490,689 | B1 * | 7/2013 | McClinton et al. ........... 166/135 |
| 2002/0092654 | A1 | 7/2002 | Coronado et al. |
| 2002/0096365 | A1 | 7/2002 | Berscheidt et al. |
| 2002/0108756 | A1 | 8/2002 | Harrall et al. |
| 2002/0139541 | A1 | 10/2002 | Sheffield et al. |
| 2003/0019639 | A1 | 1/2003 | Mackay |
| 2003/0226668 | A1 | 12/2003 | Zimmerman et al. |
| 2004/0159446 | A1 | 8/2004 | Haugen et al. |
| 2004/0216868 | A1 | 11/2004 | Owen, Sr. |
| 2004/0251025 | A1 | 12/2004 | Giroux et al. |
| 2004/0261994 | A1 | 12/2004 | Nguyen et al. |
| 2005/0098313 | A1 | 5/2005 | Atkins et al. |
| 2006/0186602 | A1 | 8/2006 | Martin et al. |
| 2007/0039161 | A1 | 2/2007 | Garcia |
| 2007/0227745 | A1 | 10/2007 | Roberts et al. |
| 2008/0105438 | A1 | 5/2008 | Jordan et al. |
| 2008/0236842 | A1 | 10/2008 | Bhavsar et al. |
| 2009/0065216 | A1 | 3/2009 | Frazier |
| 2009/0126436 | A1 | 5/2009 | Fly et al. |
| 2009/0139720 | A1 | 6/2009 | Frazier |
| 2009/0211770 | A1 | 8/2009 | Nutley et al. |
| 2010/0038076 | A1 | 2/2010 | Spray et al. |
| 2010/0116495 | A1 | 5/2010 | Spray |
| 2010/0276159 | A1 | 11/2010 | Mailand et al. |
| 2010/0326650 | A1 | 12/2010 | Tran et al. |
| 2011/0048743 | A1 | 3/2011 | Stafford et al. |
| 2011/0132143 | A1 | 6/2011 | Xu et al. |
| 2011/0132612 | A1 | 6/2011 | Agrawal et al. |
| 2011/0132619 | A1 | 6/2011 | Agrawal et al. |
| 2011/0132620 | A1 | 6/2011 | Agrawal et al. |
| 2011/0135953 | A1 | 6/2011 | Xu et al. |
| 2011/0259610 | A1 | 10/2011 | Shkurti et al. |
| 2011/0314881 | A1 | 12/2011 | Hatcher et al. |
| 2012/0090839 | A1 | 4/2012 | Rudic |
| 2012/0145378 | A1 | 6/2012 | Frazier |
| 2012/0205872 | A1 | 8/2012 | Reinhardt et al. |
| 2012/0234546 | A1 | 9/2012 | Xu |
| 2012/0234547 | A1 | 9/2012 | O'Malley et al. |
| 2013/0008671 | A1 | 1/2013 | Booth |
| 2013/0048305 | A1 | 2/2013 | Xu et al. |
| 2013/0299185 | A1 | 11/2013 | Xu et al. |
| 2013/0299192 | A1 | 11/2013 | Xu et al. |
| 2013/0300066 | A1 | 11/2013 | Xu et al. |
| 2013/0319668 | A1 | 12/2013 | Tschetter et al. |
| 2014/0060834 | A1 | 3/2014 | Quintero et al. |
| 2014/0262327 | A1 | 9/2014 | Xu et al. |
| 2014/0360728 | A1 | 12/2014 | Tashiro et al. |

OTHER PUBLICATIONS

Notification of Transmittal of the International Preliminary Report on Patentability and the Written Opinion of the International Searching Authority, or the Declaration; PCT/US2013/020046; Jul. 29, 2014, 5 pages.

Notification of Transmittal of the International Search Report on Patentability and the Written Opinion of the International Searching Authority, or the Declaration; PCT/US2013/020046;Apr. 10, 2013, 7 pages.

Notification of Transmittal of the International Search Report and the Written Opinion of the International Searching Authority, or the Declaration; PCT/US2014/010862; Apr. 21, 2014; 9 pages.

Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; Mar. 24-25, 2015; 10 Pages.

Garry Garfield, "Formation Damage Control Utilizing Composite-Bridge-Plug Technology for Monobore, Multizone Stimulation Operations," SPE 70004, Copyright 2001, Society of Petroleum Engineers Inc., This paper was prepared for presentation at the SPE Per.

International Preliminary Report on Patentability; PCT/US2013/050475; Mailed Feb. 26, 2015; 10 Pages.

International Search Report for related PCT Application No. PCT/US2013/035258, dated Jul. 4, 2013, pp. 1-4.

International Search Report for related PCT Application No. PCT/US2013/035261, dated Jul. 10, 2013, pp. 1-4.

International Search Report for related PCT Application No. PCT/US2013/035262, dated Jul. 1, 2013, pp. 1-4.

International Search Report for related PCT Application No. PCT/US2013/068062, dated Feb. 12, 2014, pp. 1-3.

M.T. Triolo et al., "Resolving the Completion Engineer's Dilemma: Permanent or Retrievable Packer?"; Society of Petroleum Engineers, SPE Paper No. 76711; May 20, 2002; 16 pages.

Martin P. Coronado, "Development of an Internal Coiled Tubing Connector Utilizing Permanent Packer Technology"; Society of Petroleum Engineers, SPE Paper No. 46036; Apr. 15, 1998; 10 pages.

Simulia Realistic Simulation News, [online]; [retrieved on Jan. 10, 2013]; retrieved from the internet http://www.3ds.com/fileadmin/brands/SIMULIA/Customer_Stories/Baker_Hughes/Energy_BakerHughes_RSN_Feb11.pdf, Baker Hughes Refines Expandable Tubular.

* cited by examiner

ONE-WAY FLOWABLE ANCHORING SYSTEM AND METHOD OF TREATING AND PRODUCING A WELL

CROSS REFERENCE TO RELATED APPLICATION

This application is a continuation-in-part application of U.S. patent application Ser. No. 13/705,972, filed Dec. 5, 2012 which is a continuation-in-part of U.S. patent application Ser. No. 13/358,307, filed Jan. 25, 2012, the entire contents of which are incorporated herein by reference.

BACKGROUND

Tubular systems, such as those used in the completion and carbon dioxide sequestration industries often employ anchors to positionally fix one tubular to another tubular. Although existing anchoring systems serve the function for which they are intended, the industry is always receptive to new systems and methods for anchoring tubulars.

BRIEF DESCRIPTION

Disclosed herein is a one-way flowable anchoring system. The system includes a plurality of same anchors that are sealedly fixedly engagable within a structure and each of the plurality of same anchors has a flow bore longitudinally therethrough with a first seat and a second seat on opposing ends thereof The system also has a plug positionable within the structure between two of the plurality of same anchors positioned longitudinally adjacent one another. The plug is sealedly engagable to substantially block flow through the flow bore of a first of the plurality of same anchors when sealingly engaged with the first seat thereof and the plug is seatingly engagable to allow flow around the plug and into the flow bore of the second of the plurality of same anchors through an area at least equal to that of the flow bore when the plug is seated at the second seat thereof Further disclosed herein is a method of treating and producing a well. The method includes pressuring up against a first plug sealingly engaged at a first seat of a first anchor sealingly attached within a structure, treating the well, pressuring up against a second plug sealingly engaged at a first seat of a second anchor dimensioned the same as the first anchor and sealingly attached within the structure, treating the well, seating the first plug against a second seat of the second anchor, and flowing fluid around the second plug through openings and through a bore in the second anchor, wherein the flow area through the openings is at least as large as the flow area of the bore.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
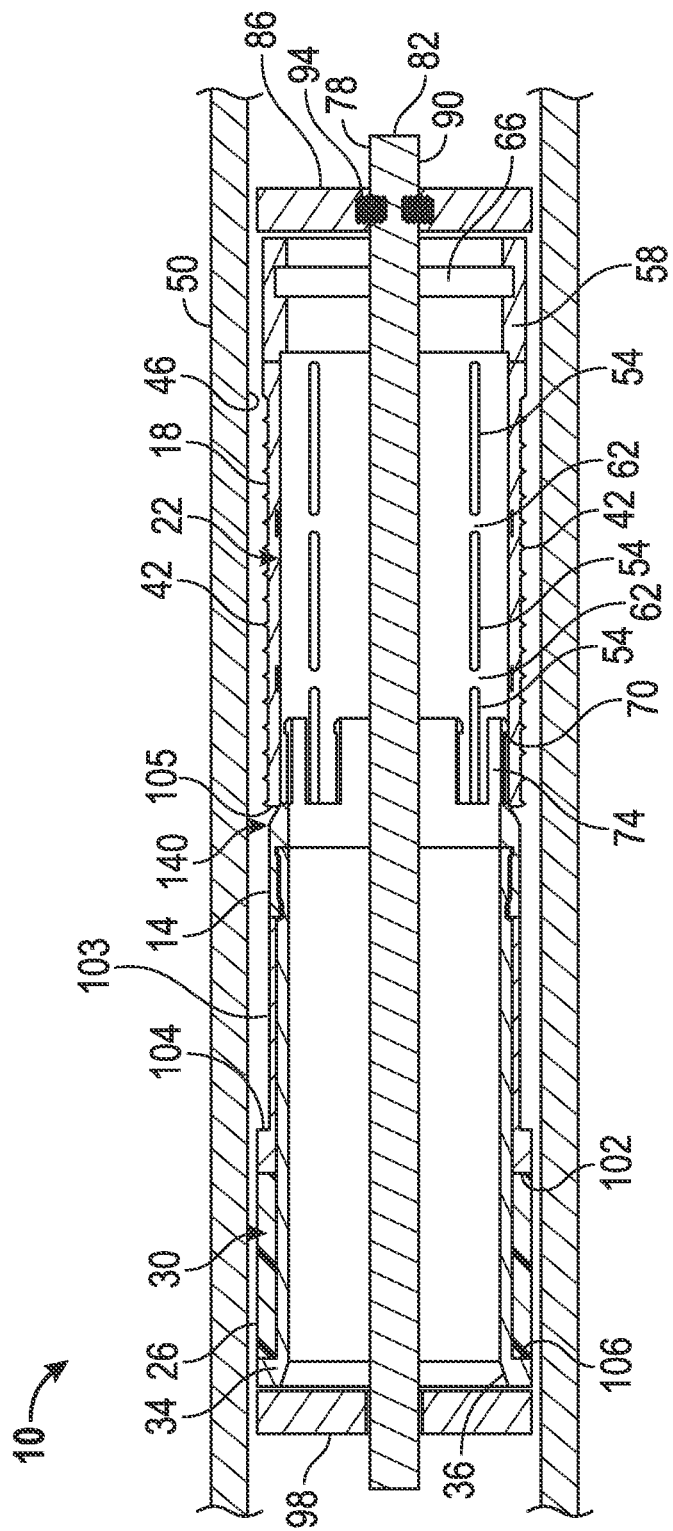
FIG. 1 depicts a cross sectional view of a tubular anchoring system disclosed herein in a non-anchoring position.
Figure 2:
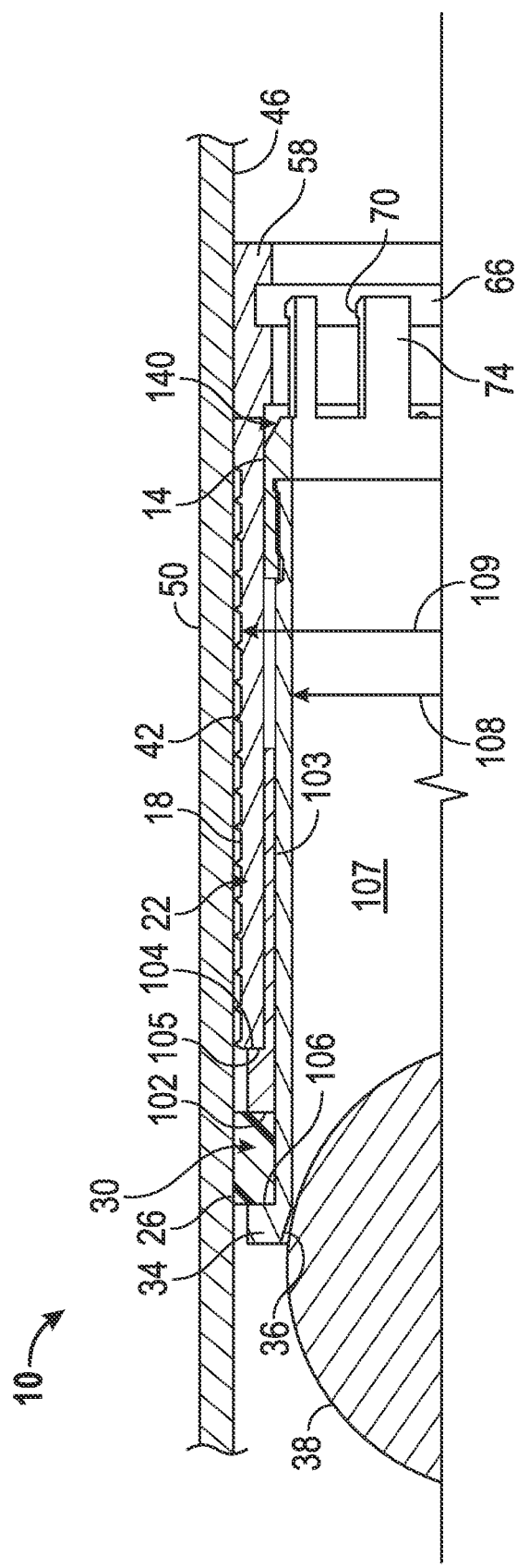
FIG. 2 depicts a cross sectional view of the tubular anchoring system of FIG. 1 in an anchoring position.

Referring to FIGS. 1 and 2, a tubular anchoring system disclosed herein is illustrated at 10. The system 10, among other things includes, a frustoconical member 14, a sleeve 18, shown herein as a slip ring having a surface 22, a seal 26, having a surface 30, and a seat 34. The system is configured such that longitudinal movement of the frustoconical member 14 relative to the sleeve 18 and relative to the seal 26 cause the surfaces 22 and 30 of the sleeve 18 and seal 26 respectively to be radially altered. And, although in this embodiment the radial alterations are in radially outward directions, in alternate embodiments the radial alterations could be in other directions such as radially inward. The seat 34 is connected with the frustoconical member 14 such that movement of the seat 34 also causes movement of the frustoconical member 14. And the seat 34 has a land 36 that is sealingly engagable with a plug 38, shown herein as a ball (in FIG. 2 only), runnable thereagainst. Once the plug 38 is sealingly engaged with the seat 34 pressure can be built upstream thereof to perform work such as fracturing an earth formation or actuating a downhole tool, for example, when employed in a hydrocarbon recovery application.

The surface 22 of the sleeve 18 in this embodiment includes protrusions 42 that may be referred to as teeth, configured to bitingly engage with a wall 46 of a structure 50, within which the system 10 is employable, when the surface 22 is in a radially altered (i.e. expanded) configuration. This biting engagement serves to anchor the system 10 to the structure 50 to prevent relative movement therebetween. Although the structure 50 disclosed in this embodiment is a tubular, such as a liner or casing in a borehole, it could just as well be an open hole in an earth formation, for example.

In the embodiment illustrated in the FIGS. 1 and 2 the sleeve 18 includes a plurality of slots 54 that extend fully through walls 58 thereof that are distributed perimetrically about the sleeve 18 as well as longitudinally along the sleeve 18. The slots 54, in this embodiment, are configured such that a longitudinal dimension of each is greater than a dimension perpendicular to the longitudinal dimension. Webs 62 in the walls 58 extend between pairs of longitudinally adjacent slots 54. The foregoing structure permits the sleeve 18 to be radially altered by the frustoconical member 14 with less force than if the slots 54 did not exist. The webs 62 may be configured to rupture during radial alteration of the sleeve 18 to further facilitate radial alteration thereof The sleeve 18 also has a recess 66 formed in the walls 58 that are receptive to shoulders 70 on fingers 74 that are attached to the seat 34. Once the seat 34 has moved sufficiently relative to the sleeve 18 that the shoulders 70 are engaged in the recess 66 the seat 34 is prevented from moving in a reverse direction relative to the sleeve 18, thereby maintaining the frustoconical member 14 longitudinally overlapping with the sleeve 18. This overlapping assures that the radial expansion of the sleeve 18 is maintained even after forces that drove the frustoconical member 14 into the sleeve 14 are withdrawn. Additional embodiments are contemplated for maintaining relative position between the frustoconical member 14 and the sleeve 18 once they have become longitudinally overlapped including frictional engagement between the frustoconical member 14 and the sleeve 18, as well as wickers on one or both of the frustoconical member 14 and the sleeve 18 that engage with a surface of the other, for example.

A setting tool 78 (FIG. 1 only) can generate the loads needed to cause movement of the frustoconical member 14 relative to the sleeve 18. The setting tool 78 can have a mandrel 82 with a stop 86 attached to one end 90 by a force failing member 94, also referred to herein as a release member, shown herein as a plurality of shear screws. A plate 98 guidingly movable along the mandrel 82 (by means not shown herein) in a direction toward the stop 86 can longitudinally urge the frustoconical member 14 toward the sleeve 18. Loads to fail the force failing member 94 can be set to only occur after the sleeve 18 has been radially altered by the frustoconical member 14 a selected amount. After failure of the force failing member 94 the stop 86 may separate from the mandrel 82 thereby allowing the mandrel 82 and the plate 98 to be retrieved to surface, for example.

Movement of the frustoconical member 14 relative to the sleeve 18 causes the seal 26 to be longitudinally compressed, in this embodiment, between a shoulder 102, on a collar 103 movable with the frustoconical member 14, and a shoulder 106, on the seat 34. This compression is caused by another shoulder 104 on the collar 103 coming in contact with an end 105 of the frustoconical member 14. This longitudinal compression results in growth in a radial thickness of the seal 26. The frustoconical member 14 being positioned radially inwardly of the seal 26 prevents the seal 26 from reducing in dimension radially. Consequently, the surface 30 of the seal 26 must increase radially. An amount of this increase can be set to cause the surface 30 to contact the walls 46 of the structure 50 (FIG. 2 only) resulting in sealing engagement therewith between. As with the anchoring of the sleeve 18 with the walls 46, the seal 26 is maintained in sealing engagement with the walls 46 by the shoulders 70 of the fingers 74 being engaged with the recess 66 in the sleeve 18.

The tubular anchoring system 10 is configured such that the sleeve 18 is anchored (positionally fixed) to the structure 50 prior to the seal 26 sealingly engaging with the structure 50. This is controlled by the fact that the seal 26 is not longitudinally compressed between the end 105 of the sleeve 18 and the shoulder 102 until a significant portion of the sleeve 18 has been radially expanded over the frustoconical member 14 and into anchoring engagement with the structure 50. Positionally anchoring the tubular anchoring system 10 to the structure 50 prior to engaging the seal 26 with the structure has the advantage of preventing relative movement between the seal 26 and the structure 50 after the seal 26 has radially expanded. This sequence prevents damage to the seal 26 that could result if the seal 26 were allowed to move relative to the structure 50 after having been radially expanded. The land 36 of the seat 34 in this embodiment is positioned longitudinally upstream (as defined by fluid flow that urges the plug 38 against the seat 34) of the sleeve 18. Additionally in this embodiment the land 36 is positioned longitudinally upstream of the seal 26. This relative positioning allows forces generated by pressure against the plug 38 seated against the land 36 to further compress the seal 28 into sealing engagement with the structure 50.

The tubular anchoring system 10 is further configured to leave a through bore 107 with a minimum radial dimension 108 that is large in relation to a radial dimension 109 defined by a largest radial dimension of the system 10 when set within the structure 50. In fact the minimum radial dimension 108 is no less than about 70% of the radial dimension 109. Such a large ratio allows the anchoring system 10 to be deployed as a treatment plug, or a frac plug, for example, in a downhole application. In such an application pressure built against the plug 38 seated at the land 36 can be used to frac a formation that the structure is positioned within. Subsequent the fracing operation production through the through bore 107 could commence, after removal of the plug 38 via dissolution or pumping, for example, without the need of drilling or milling any of the components that define the tubular anchoring system 10.

Figure 3:
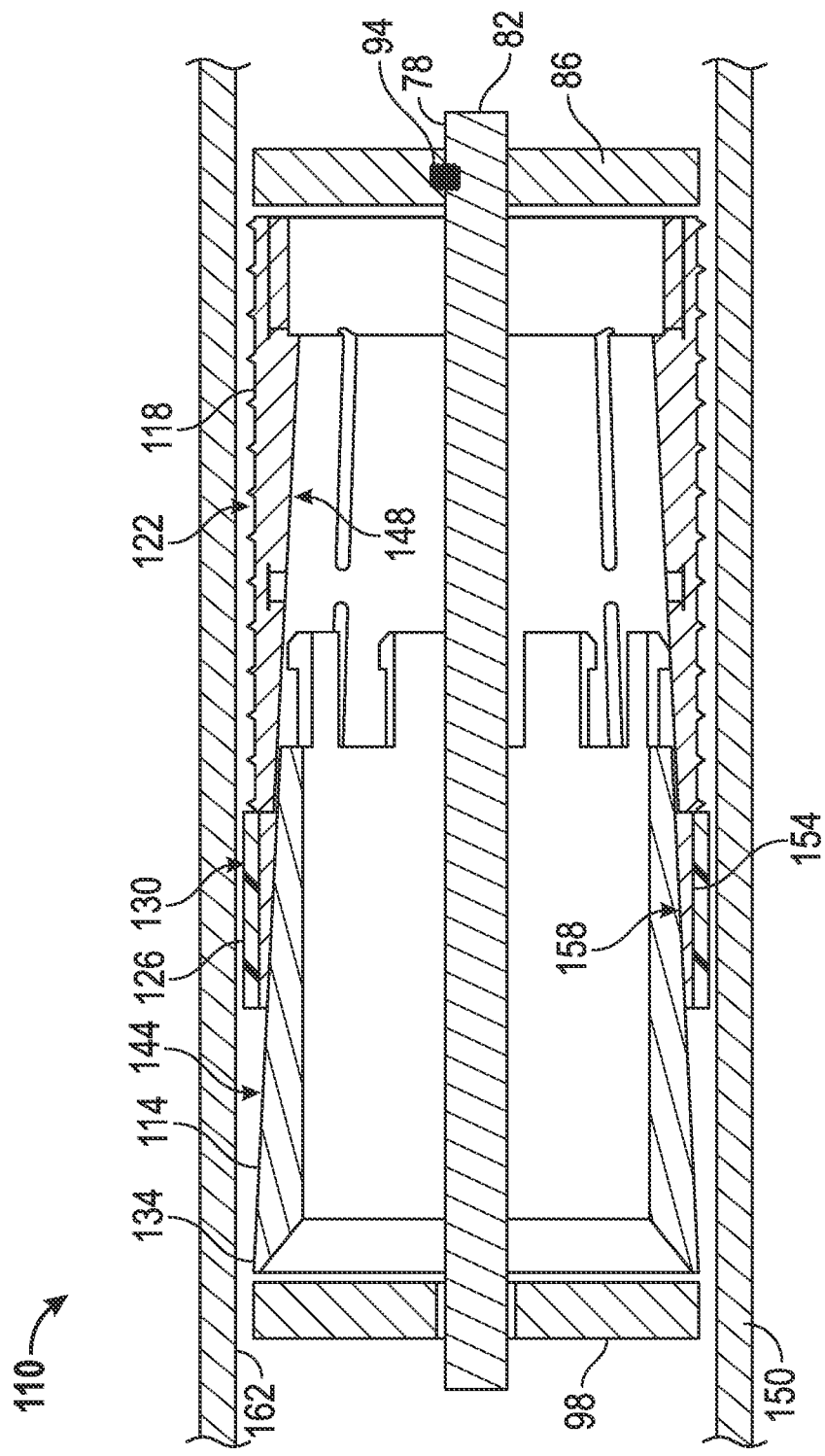
FIG. 3 depicts a cross sectional view of an alternate tubular anchoring system disclosed herein in a non-anchoring position.
Figure 4:
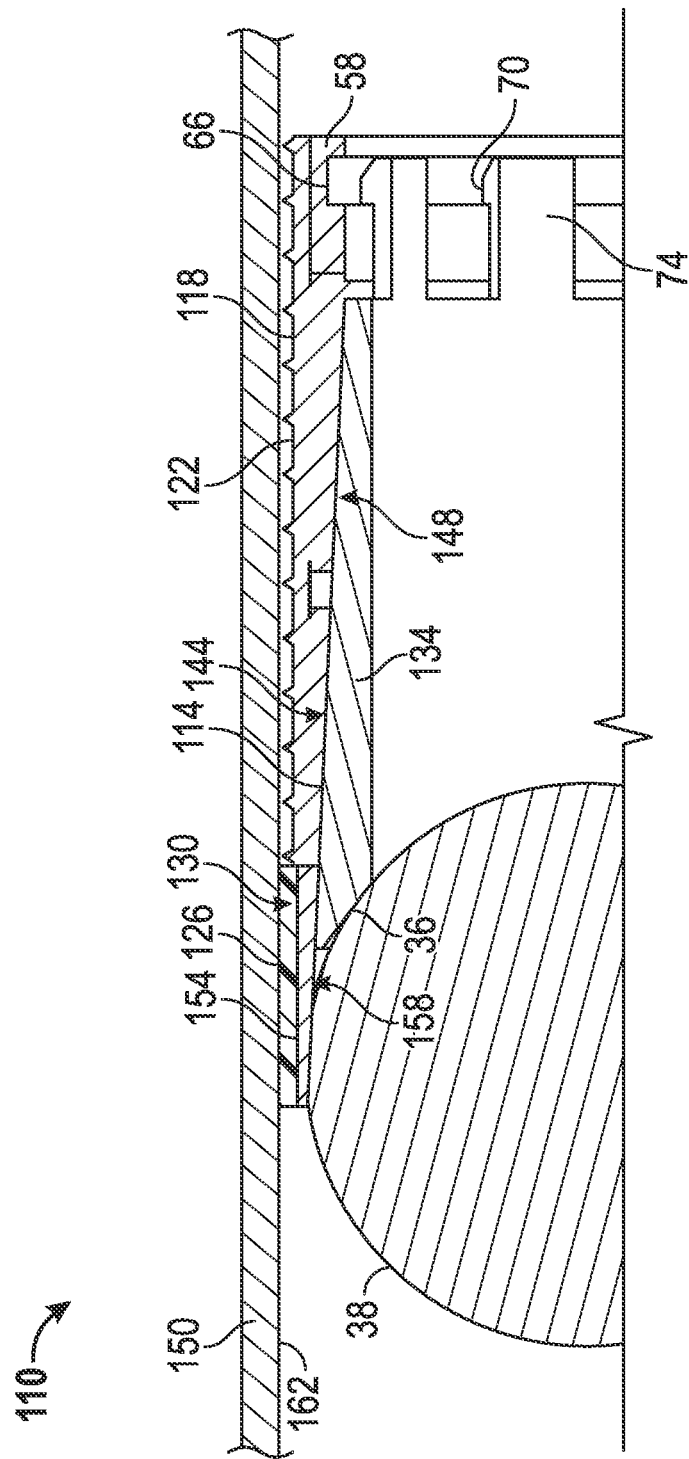
FIG. 4 depicts a cross sectional view of the tubular anchoring system of FIG. 3 in an anchoring position.

Referring to FIGS. 3 and 4, an alternate embodiment of a tubular anchoring system disclosed herein is illustrated at 110. Similar to the system 10 the system 110 includes a frustoconical member 114, a sleeve 118 having a surface 122, a seal 126 having a surface 130 and a seat 134. A primary difference between the system 10 and the system 110 is how the extents of radial alteration of the surfaces 22 and 30 are controlled. In the system 10 an extent of radial alteration of the surface 22 is determined by a radial dimension of a frustoconical surface 140 on the frustoconical member 14. And the extent of radial alteration of the surface 30 is determined by an amount of longitudinal compression that the seal 26 undergoes.

In contrast, an amount of radial alteration that the surface 122 of the sleeve 118 undergoes is controlled by how far the frustoconical member 114 is forced into the sleeve 118. A frustoconical surface 144 on the frustoconical member 114 is wedgably engagable with a frustoconical surface 148 on the sleeve 118. As such, the further the frustoconical member 114 is moved relative to the sleeve 118 the greater the radial alteration of the sleeve 118. Similarly, the seal 126 is positioned radially of the frustoconical surface 144 and is longitudinally fixed relative to the sleeve 118 so the further the frustoconical member 114 moves relative to the sleeve 118 and the seal 126 the greater the radial alteration of the seal 126 and the surface 130. The foregoing structure allows an operator to determine the amount of radial alteration of the surfaces 122, 130 after the system 110 is positioned within a structure 150.

Optionally, the system 110 can include a collar 154 positioned radially between the seal 126 and the frustoconical member 114, such that radial dimensions of the collar 154 are also altered by the frustoconical member 114 in response to the movement relative thereto. The collar 154 can have a frustoconical surface 158 complementary to the frustoconical surface 144 such that substantially the full longitudinal extent of the collar 154 is simultaneously radially altered upon movement of the frustoconical member 114. The collar 154 may be made of a material that undergoes plastic deformation to maintain the seal 126 at an altered radial dimension even if the frustoconical surface 144 is later moved out of engagement with the frustoconical surface 158, thereby maintaining the seal 126 in sealing engagement with a wall 162 of the structure 150.

Other aspects of the system 110 are similar to those of the system 10 including, the land 36 on the seat 126 sealably engagable with the plug 38. And the slots 54 and the webs 62 in the walls 58 of the sleeve 118. As well as the recess 66 in the sleeve 118 receptive to shoulders 70 on the fingers 74. Additionally, the system 110 is settable with the setting tool 78 in a similar manner as the system 10 is settable with the setting tool 78.

Figure 5:
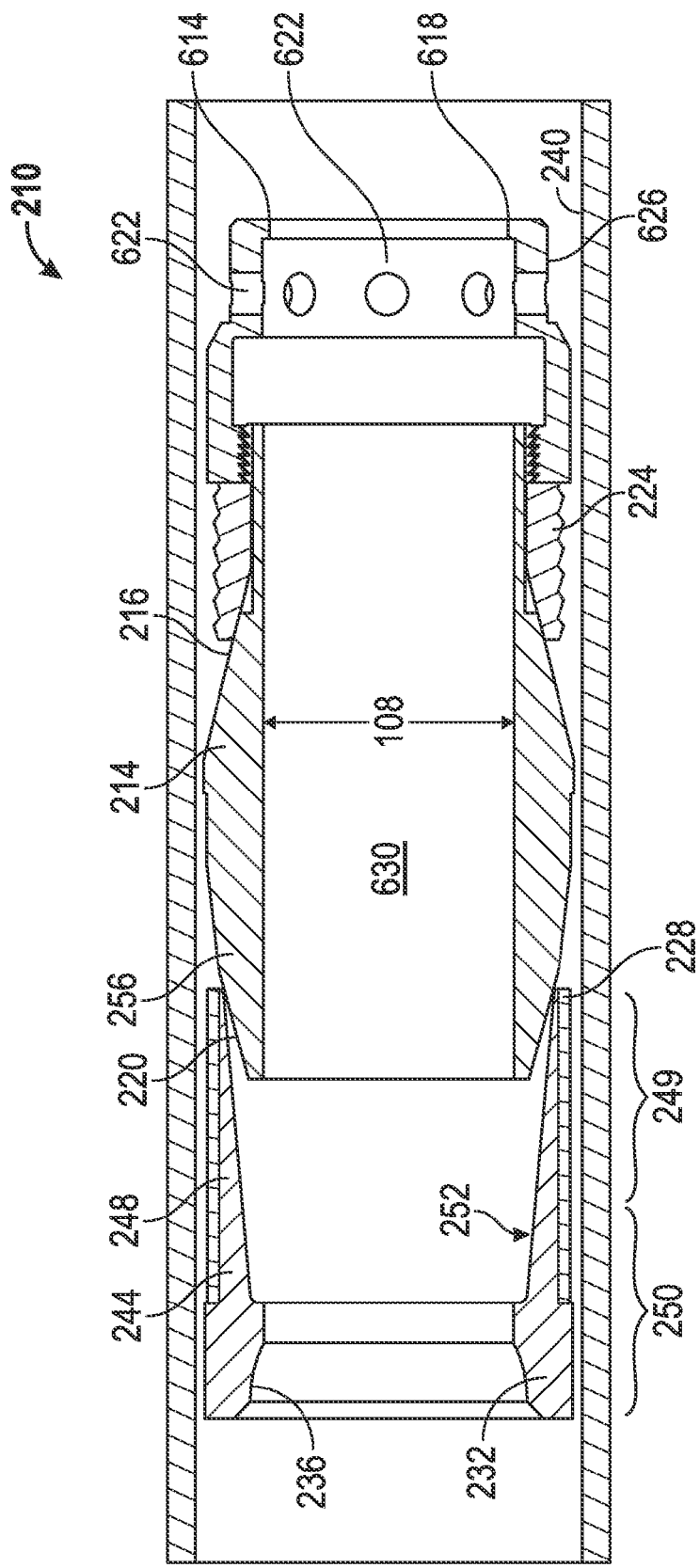
FIG. 5 depicts a cross sectional view of an alternate tubular anchoring system disclose herein.

Referring to FIG. 5 an alternate embodiment of a tubular anchoring system disclosed herein is illustrated at 210. The system 210 includes, a frustoconical member 214 having a first frustoconical portion 216 and a second frustoconical portion 220 that are tapered in opposing longitudinal directions to one another. Slips 224 are radially expandable in response to being moved longitudinally against the first frustoconical portion 216. Similarly, a seal 228 is radially expandable in response to being moved longitudinally against the second frustoconical portion 220. One way of moving the slips 224 and the seal 228 relative to the frustoconical portions 216, 220 is to longitudinally compress the complete assembly with a setting tool that is not shown herein, that could be similar to the setting tool 78. The system 210 also includes a seat 232 with a surface 236 that is tapered in this embodiment and is receptive to a plug (not shown) that can sealingly engage the surface 236.

The tubular anchoring system 210 is configured to seal to a structure 240 such as a liner, casing or open hole in an earth formation borehole, for example, as is employable in hydrocarbon recovery and carbon dioxide sequestration applications. The sealing and anchoring to the structure 240 allows pressure built against a plug seated thereat to build for treatment of the earth formation as is done during fracturing and acid treating, for example. Additionally, the seat 232 is positioned in the system 210 such that pressure applied against a plug seated on the seat 232 urges the seat 232 toward the slips 224 to thereby increase both sealing engagement of the seal 228 with the structure 240 and anchoring engagement of the slips 224 with the structure 240.

The tubular anchoring system 210 can be configured such that the slips 224 are anchored (positionally fixed) to the structure 240 prior to the seal 228 sealingly engaging with the structure 240, or such that the seal 228 is sealingly engaged with the structure 240 prior to the slips 224 anchoring to the structure 240. Controlling which of the seal 228 and the slips 224 engage with the structure first can be through material properties relationships or dimensional relationships between the components involved in the setting of the seal 228 in comparison to the components involved in the setting of the slips 224. Regardless of whether the slips 224 or the seal 228 engages the structure 240 first may be set in response to directions of portions of a setting tool that set the tubular anchoring system 210. Damage to the seal 228 can be minimized by reducing or eliminating relative movement between the seal 228 and the structure 50 after the seal 228 is engaged with the structure 240. In this embodiment, having the seal 228 engage with the structure 240 prior to having the slips 224 engage the structure 240 may achieve this goal. Conversely, in the embodiment of the tubular anchoring system 10, discussed above, having the sleeve 18 engage with the structure 50 before the seal 26 engages with the structure may achieve this goal.

The land 236 of the seat 232 in this embodiment is positioned longitudinally upstream (as defined by fluid flow that urges a plug against the seat 232) of the slips 224. Additionally in this embodiment the land 236 is positioned longitudinally upstream of the seal 228. This relative positioning allows forces generated by pressure against a plug seated against the land 236 to further urge the seal 228 into sealing engagement with the structure 240.

The seat 232 of the embodiment illustrated in the system 210 also includes a collar 244 that is positioned between the seal 228 and the second frustoconical portion 220. The collar 244 illustrated has a wall 248 whose thickness is tapered due to a radially inwardly facing frustoconical surface 252 thereon. The varied thickness of the wall 248 allows for thinner portions to deform more easily than thicker portions. This can be beneficial for at least two reasons. First, the thinner walled portion 249 needs to deform when the collar 244 is moved relative to the second frustoconical portion 220 in order for the seal 228 to be radially expanded into sealing engagement with the structure 240. And second, the thicker walled portion 250 needs to resist deformation due to pressure differential thereacross that is created when pressuring up against a plug seated at the seat 232 during treatment operations, for example. The taper angle of the frustoconical surface 252 may be selected to match a taper angle of the second frustoconical portion 220 to thereby allow the second frustoconical portion 220 to provide radial support to the collar 244 at least in the areas where they are in contact with one another.

Regardless of whether the taper angles match, the portion of the collar 244 that deforms conforms to the second frustoconical portion 220 sufficiently to be radially supported thereby. The taper angles may be in the range of 14 to 20 degrees to facilitate radial expansion of the collar 244 and to allow frictional forces between the collar 244 and the second frustoconical portion 220 to maintain positional relationships therebetween after removal of longitudinal forces that caused the movement therebetween. (The first frustoconical portion 216 may also have taper angles in the range of 14 to 20 degrees for the same reasons that the second frustoconical portion 220 does). Either or both of the frustoconical surface 252 and the second frustoconical portion 220 may include more than one taper angle as is illustrated herein on the second frustoconical portion 220 where a nose 256 has a larger taper angle than the surface 220 has further from the nose 256. Having multiple taper angles can provide operators with greater control over amounts of radial expansion of the collar 244 (and subsequently the seal 228) per unit of longitudinal movement between the collar 244 and the frustoconical member 214. The taper angles, in addition to other variables, also provide additional control over longitudinal forces needed to move the collar 244 relative to the frustoconical member 214. Such control can allow the system 210 to preferentially expand the collar 244 and the seal 228 to set the seal 228 prior to expanding and setting the slips 224. Such a sequence may be desirable since setting the slips 224 before the seal 228 would require the seal 228 to move along the structure 240 after engaging therewith, a condition that could damage the seal 228.

Figure 6:
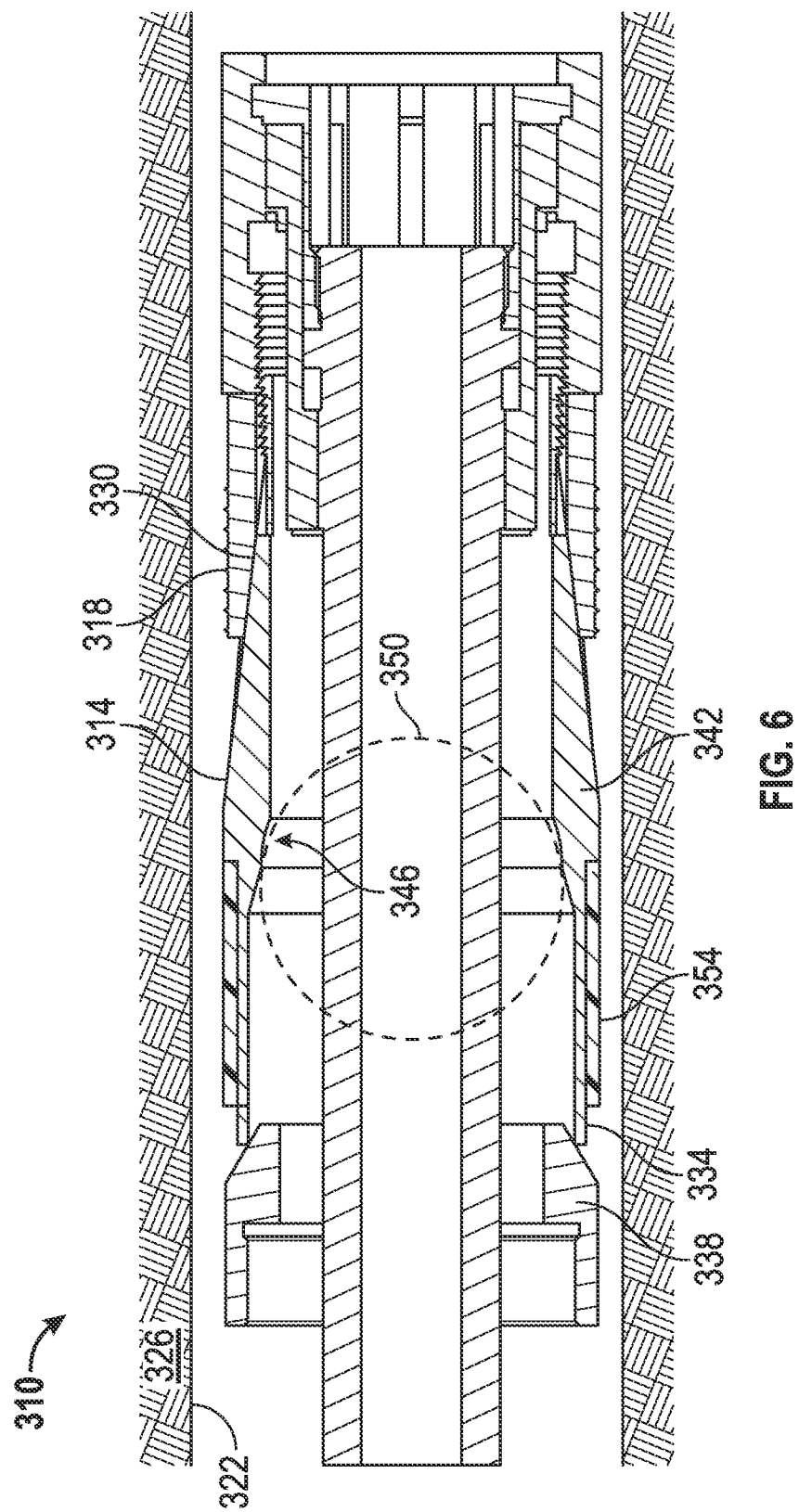
FIG. 6 depicts a cross sectional view of yet another alternate tubular anchoring system disclosed herein

Referring to FIG. 6, another alternate embodiment of a tubular anchoring system disclosed herein is illustrated at 310. The system 310 includes a first frustoconical member 314, slips 318 positioned and configured to be radially expanded into anchoring engagement with a structure 322, illustrated herein as a wellbore in an earth formation 326, in response to be urged against a frustoconical surface 330 of the first frustoconical member 314. A collar 334 is radially expandable into sealing engagement with the structure 322 in response to be urged longitudinally relative to a second frustoconical member 338. And a seat 342 with a surface 346 sealingly receptive to a plug 350 (shown with dashed lines) runnable thereagainst. The seat 342 is displaced in a downstream direction (rightward in FIG. 6) from the collar 334 as defined by fluid that urges the plug 350 against the seat 342. This configuration and position of the surface 346 relative to the collar 334 aids in maintaining the collar 334 in a radially expanded configuration (after having been expanded), by minimizing radial forces on the collar 334 due to pressure differential across the seat 342 when plugged by a plug 350.

To clarify, if the surface 346 were positioned in a direction upstream of even a portion of the longitudinal extend of the collar 334 (which it is not) then pressure built across the plug 350 seated against the surface 346 would generate a pressure differential radially across the portion of the collar 334 positioned in a direction downstream of the surface 346. This pressure differential would be defined by a greater pressure radially outwardly of the collar 334 than radially inwardly of the collar 334, thereby creating radially inwardly forces on the collar 334. These radially inwardly forces, if large enough, could cause the collar 334 to deform radially inwardly potentially compromising the sealing integrity between the collar 334 and the structure 322 in the process. This condition is specifically avoided by the positioning of the surface 346 relative to the collar 334 of the instant invention.

Optionally, the tubular anchoring system 310 includes a seal 354 positioned radially of the collar 334 configured to facilitate sealing of the collar 334 to the structure 322 by being compressed radially therebetween when the collar 334 is radially expanded. The seal 354 may be fabricated of a polymer to enhance sealing of the seal 354 to both the collar 334 and the structure 322.

Figure 7:
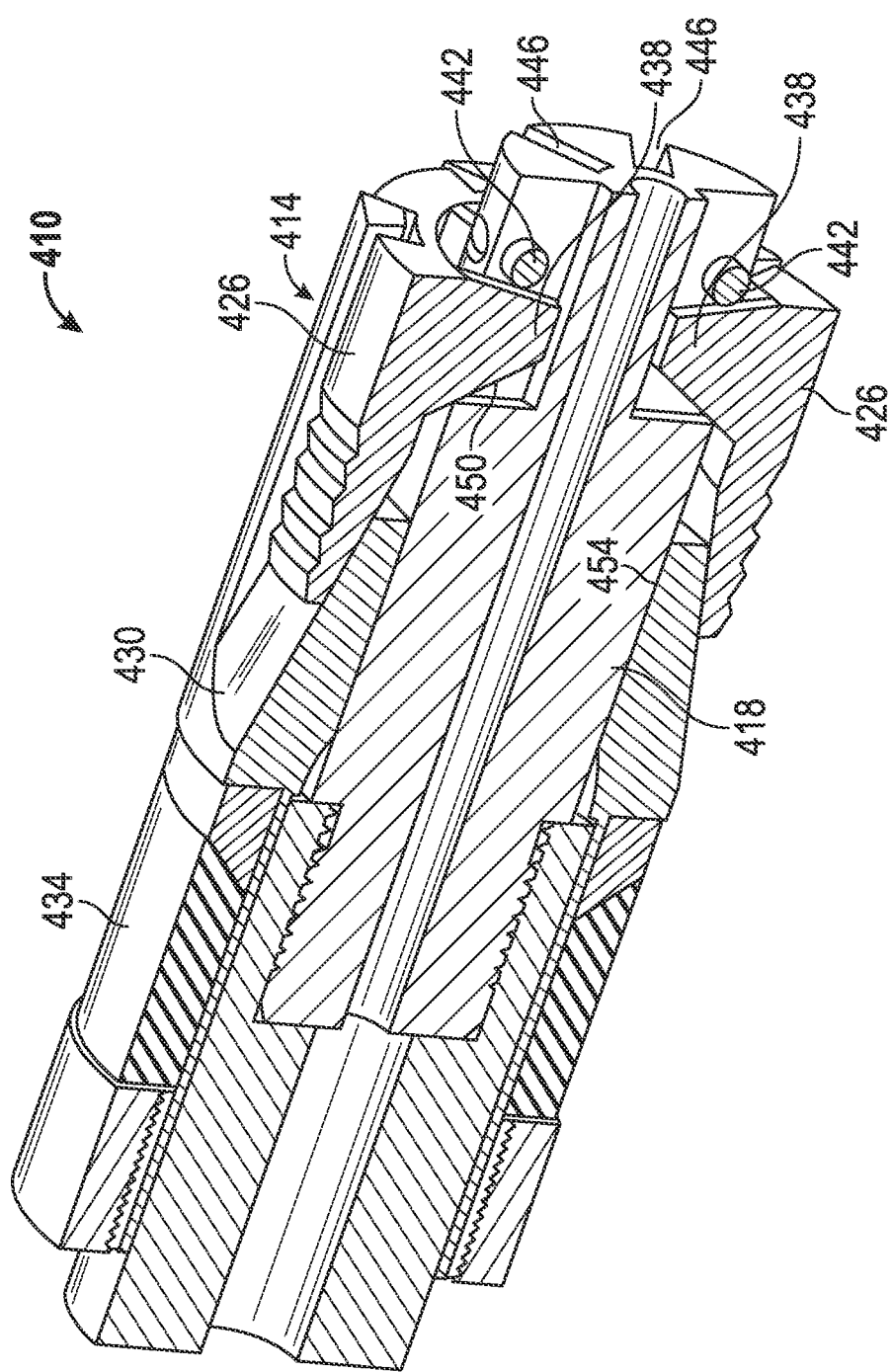
FIG. 7 depicts a cross sectional perspective view of a tool setting arrangement disclosed herein.
Figure 8:
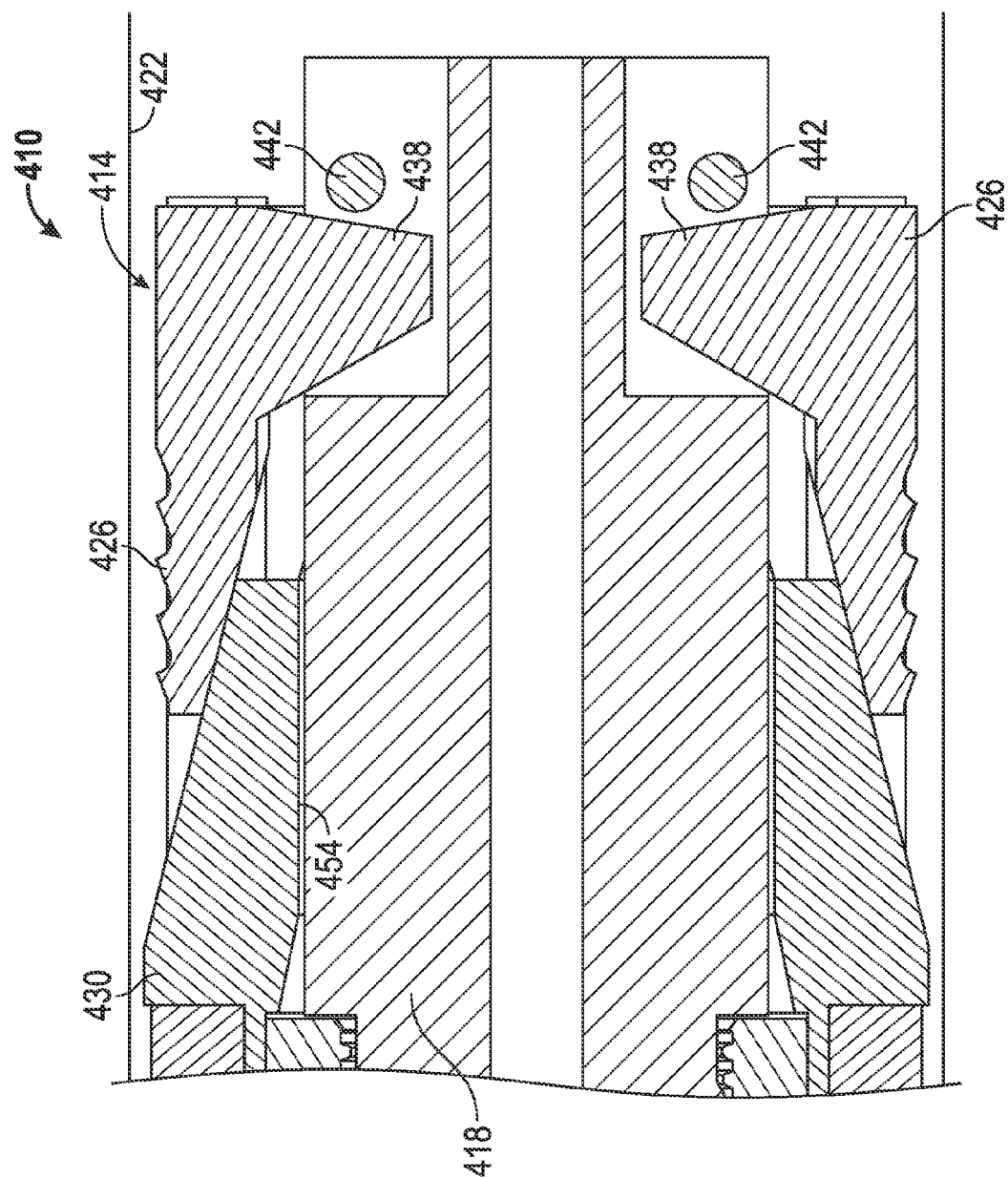
FIG. 8 depicts a magnified partial cross sectional view of the tool setting arrangement of FIG. 7.
Figure 9:
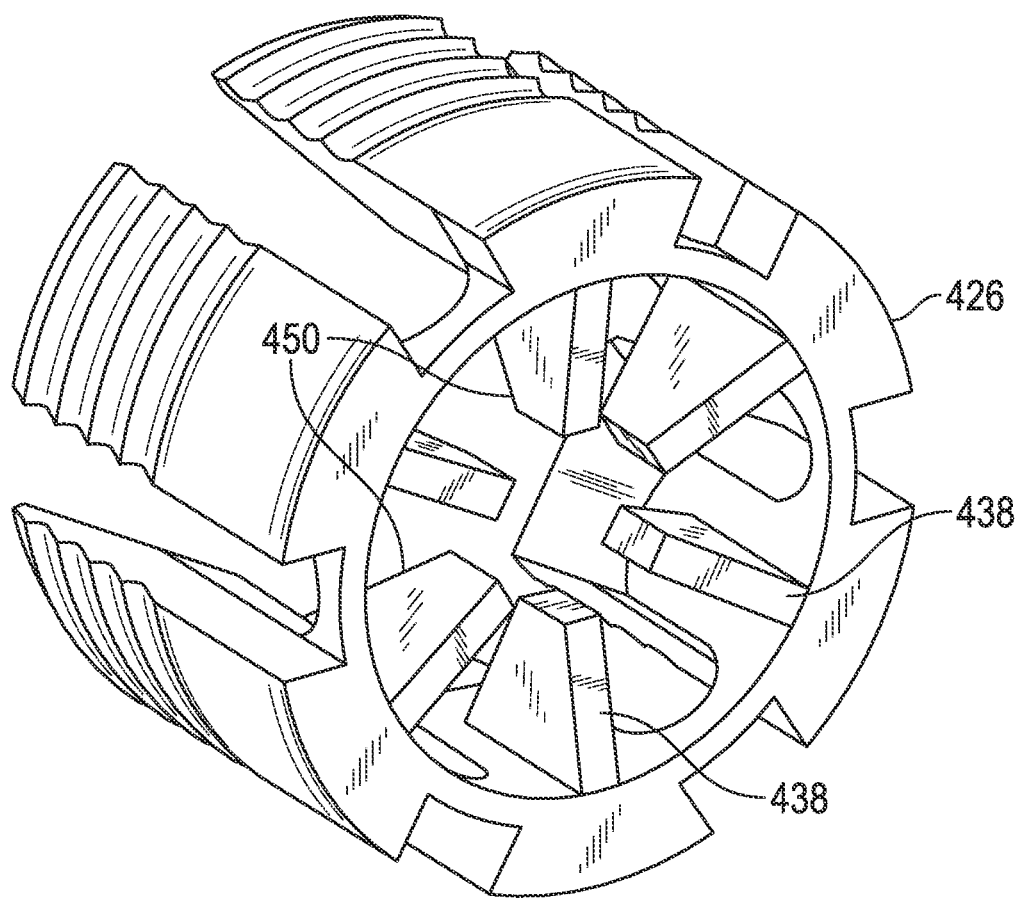
FIG. 9 depicts a perspective view of slips employed in the tool setting arrangement of FIG. 7.

Referring to FIGS. 7 through 9, an embodiment of a tool setting arrangement disclosed herein is illustrated at 410. The arrangement 410 includes a tool 414 disposed on a mandrel 418 that is runnable within a structure 422 (FIG. 8 only), illustrated herein as a casing or drill string in a borehole in an earth formation such as a wellbore. The tool 414 in this embodiment is a treatment plug or frac plug that has slips 426 that move radially outwardly upon axial movement against a cone 430. The slips 426 are configured to bite into the structure 422 at a selected setting load to anchor the tool 414 to the structure 422. The tool 414 of this embodiment also has a seal 434 configured to radially expand to sealingly engage the structure 422 at loads less than the setting load. Axial loads are applied to a portion 438 of the slips 426 by a feature 442 of the mandrel 418. The portion 438 in this embodiment is a fin that protrudes radially inwardly from a balance of the slips 426, while the feature 442 is a pin that spans a slot 446 oriented substantially parallel to an axis of the mandrel 418. One or both of the portion 438 and the feature 442 are configured to release when a selected release load between the portion 438 and the feature 442 is reached. Upon such release the mandrel 18 disengages from the tool 414 and is free to be withdrawn from the tool 414 thereby leaving the tool 414 sealably anchored to the structure 422.

Referring to FIG. 9, depending upon the specific configuration of the portion 438 and the feature 442, release of the portion 438 or the feature 442 can be reversible. In the embodiment illustrated, however, the release is not reversible as one or both of the portion 438 and the feature 442 are sheared at the release load. Design parameters of the portion 438 and the feature 442 can be adjusted to control loads at which each is releasable. If the feature 442 releases at the release load then the features 442 are sheared and the portion 438 is left intact. The embodiment includes six of the slips 426 with each of the slips 426 having one of the portions 438. As such after release the six portions 438 remain intact thereby jointly forming a seat 450 having a radial dimension capable of catching a runnable member (not shown) such as a ball for example.

Alternately, an operator can selectively have the portions 438 release at the release load thereby leaving the features 442 intact. In such an embodiment the portions 438 are sheared off at a radial dimension at least equal to the outer radial dimension defined by the features 442. In this scenario the tool 414 can be configured to leave no radial dimension smaller than an inner radial surface 454 (FIGS. 7 and 8) of the cone 430 that defines a smallest radial dimension of the cone 430 and of the balance of the tool 414. Such a configuration may be desirable to allow for intervention therethrough while minimizing radial restrictions.

Figure 10:
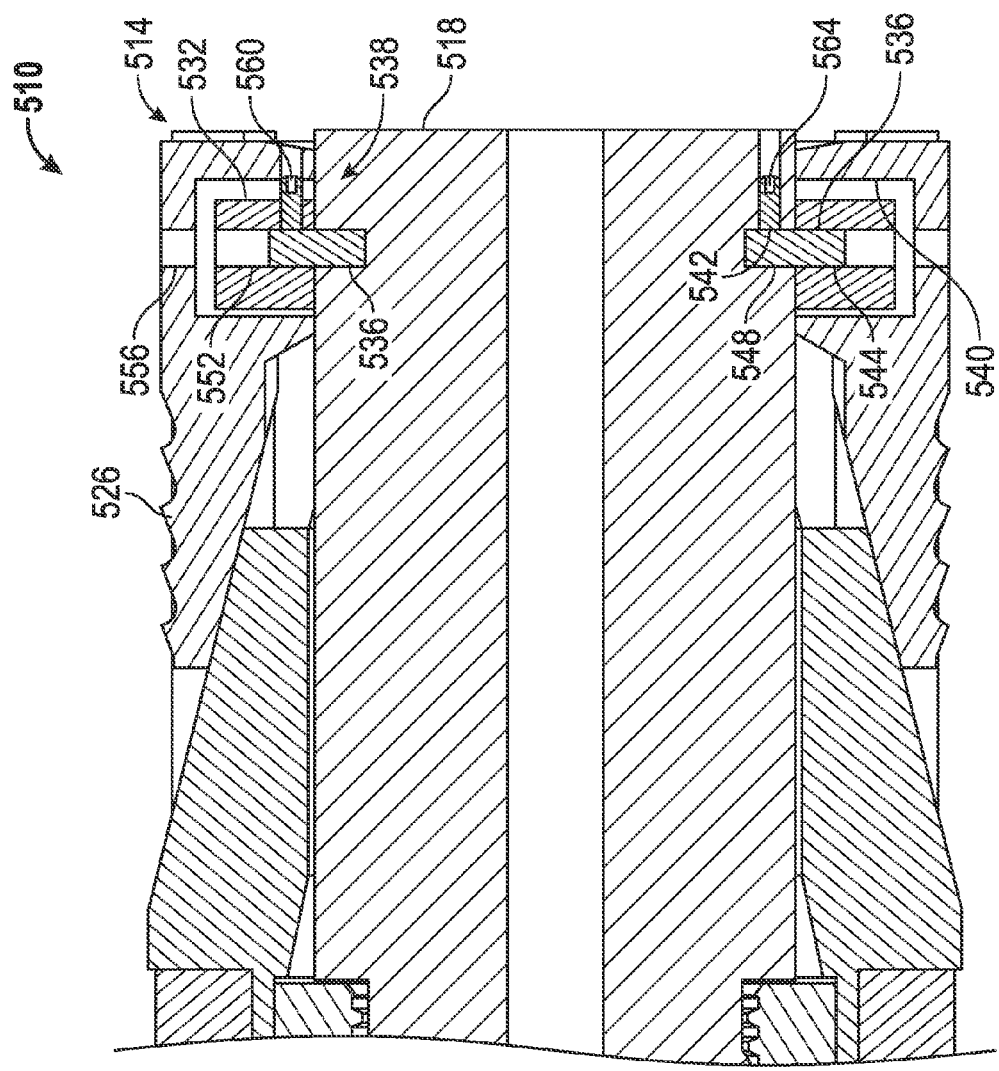
FIG. 10 depicts a partial cross sectional view of an alternate embodiment of a tool setting arrangement disclosed herein.

Referring to FIG. 10, an alternate embodiment of a tool setting arrangement disclosed herein is illustrated at 510. The arrangement 510 is similar to the arrangement 410 in many ways and elements common to both arrangements 410, 510 are identified with the same reference character and are not described again hereunder. The arrangement 510 includes a tool 514 disposed on a mandrel 518 that is runnable within a structure. The tool 514 in this embodiment is a treatment plug that has slips 526 that move radially outwardly upon axial movement against the cone 430. A portion 538 of the slips 526 have a ring 532 with release members 536, shown herein as pins or shear screws. The release members 536 protrude radially inwardly from the ring 532 that is positioned within a recess 540 of the slips 526 and engage with a feature 542 of the mandrel 518 that is a shoulder in this embodiment. The release members 536 shear at the release load thereby allowing the mandrel 518 to be withdrawn from the tool 514 leaving a minimum radial dimension through the tool 514 that is no smaller than that of the cone 430. Additionally, the ring 532 is maintained in the recess 540 of the slips 526 after removal of the mandrel 518. As such, by retaining a first portion 544 of the release members 536 in the ring 532 and a second portion 548 of the release members 536 in the feature 542, in this embodiment, no pieces of debris are generated during release that is not physically retained by the tool 514 or the mandrel 518.

The release members 536 can be retained by the tool 514 and the mandrel 518 in different ways. One way is to have the release members threadably engaged into the mandrel 518 through radial holes 552 formed in the ring and radially holes 556 formed in the slips 526. Set screws 560 could then hold the portions 548 to the ring 532 after release of the release members 536. Another way is to have portion 544 of the release members 536 threadably engaged to the ring 532 and have the portion 548 retained to the mandrel 518 by set screws 564. Alternate methods could also be employed to assure that the portions 544, 548 of the release members 536 are retained in at least one of the ring 532 and the mandrel 518.

Referring again to FIG. 5, a plurality of the tubular anchoring systems 210 can be positioned within the structure 240. Doing so will create a one-way flowable anchoring system since the plug 38 (FIG. 4) positioned between two of the systems 210 longitudinally adjacent to one another will sealingly engage with the seat 232 of one of the two systems 210, as discussed above, and will seat against a seat 614 on an opposing end of the other of the two systems 210. The seat 614 can have different configurations as will be discussed in detail hereunder. For example, the seat 614, as illustrated in FIG. 5, has a continuous lip 618 such that the plug 38 sealingly engages therewith. The system 210 is configured to substantially center the plug 38 within the structure 240 when the plug 38 is seatingly engaged with the seat 614. This assures that fluid is free to flow around the plug 38 in any direction. One or more openings 622, with eight being illustrated as holes, are formed in a housing 626 defining the seat 614 to allow flow that passes the plug 38 to enter a bore 630 through the system 210. The bore 630 is intentionally made with the dimension 108 (as originally shown in FIG. 2) relatively large as discussed above with reference to the embodiment of system 10 to allow production through the system 10 without removal from the structure (item 50 in FIG. 2 and item 240 in FIG. 5). The dimension 108, by being relatively large will reduce pressure drops generated by fluid flowing through the system 210.

The one-way flowable anchoring system disclosed herein allows for production fluid flow therethrough while the plug 38 remains in place. Such a system can be beneficial whether or not the plug 38 is removable by dissolution, for example, since fluid can be produced around the plug 38 as long as it remains in place. Total flow area of the openings 622 is set to be equal to or greater than the area of the bore 630 to reduce pressure drops generated when fluid flows through the openings 622. Similarly, area between the structure 240 and the plug 38 is also set to be equal to or greater than the area of the bore 630 to reduce pressure drops generated when fluid flows past the plug 38.

Figure 11:
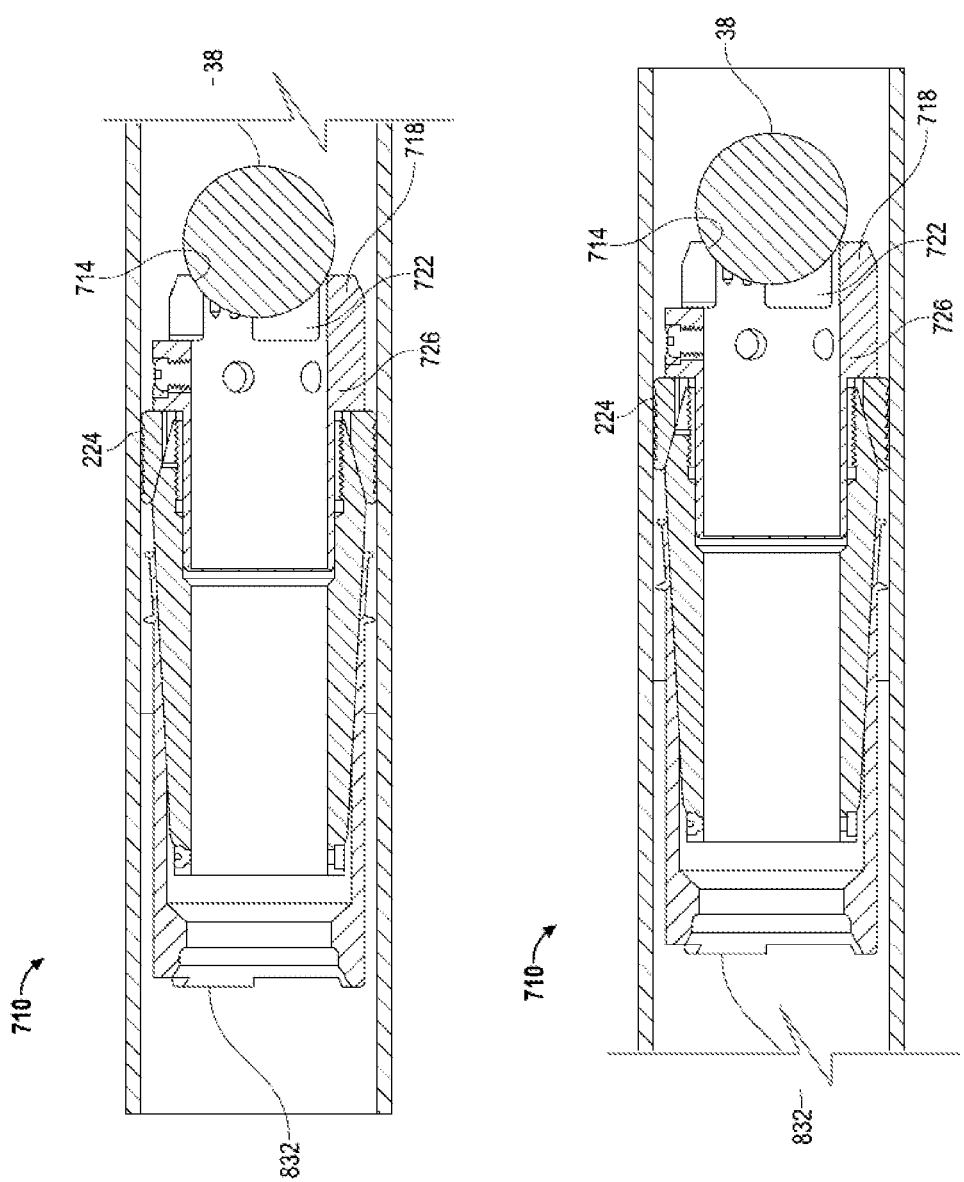
FIG. 11 depicts a cross sectional view of an anchor employable in a one-way flowable anchoring system disclosed herein.

Referring to FIG. 11, an alternate embodiment of a tubular anchoring system is illustrated at 710. The system 710 is similar to the system 210 with one primary difference being that the plug 38 is not sealable to a seat 714 on the system 710 as it is on the seat 614 of the system 210. The seat 710 has castellations 718 that defines openings 722 in a housing 726.

Figure 12:
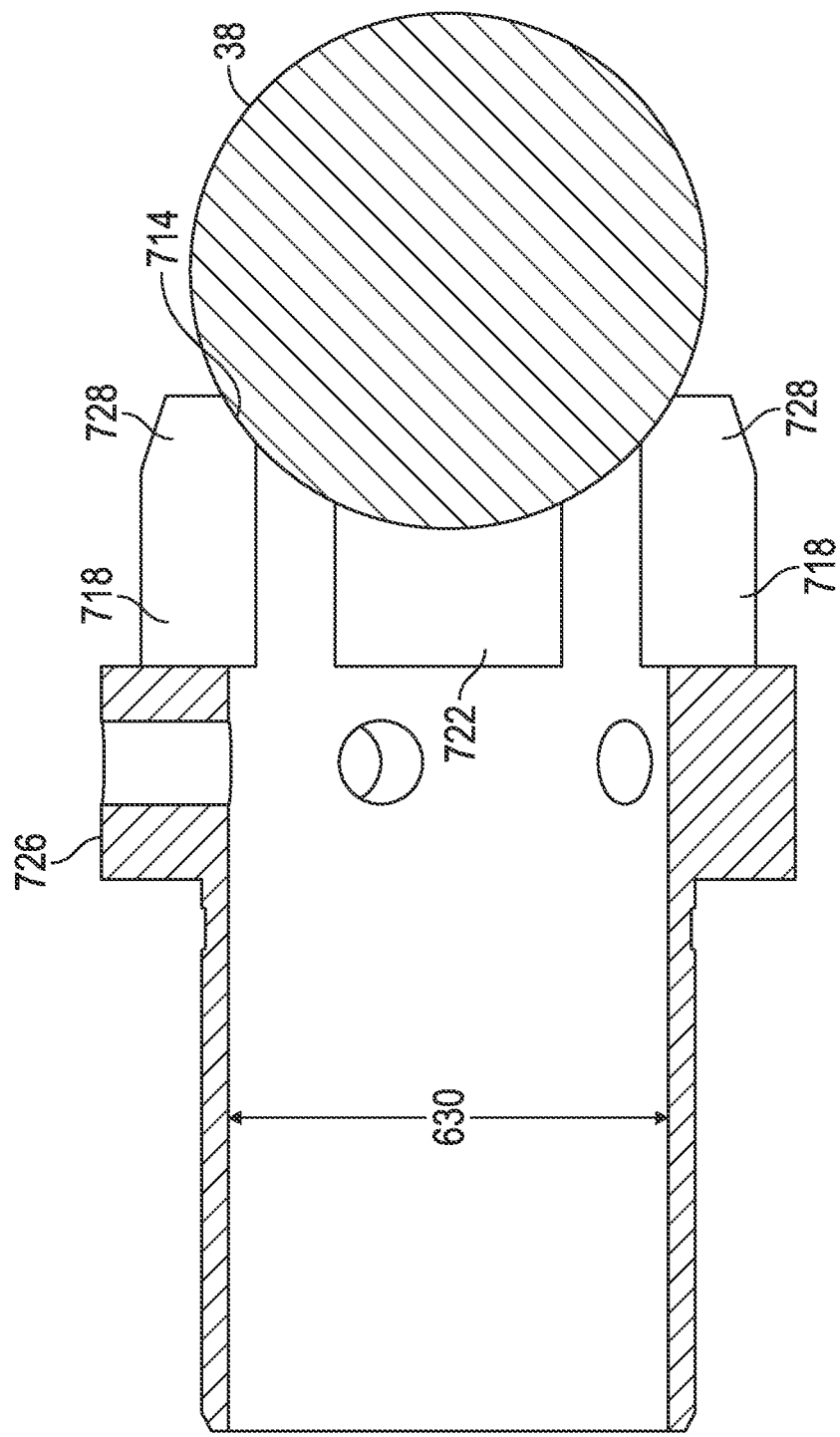
FIG. 12 depicts a cross sectional view of a housing employable in an anchor of a one-way flowable anchoring system disclosed herein.
Figure 13:
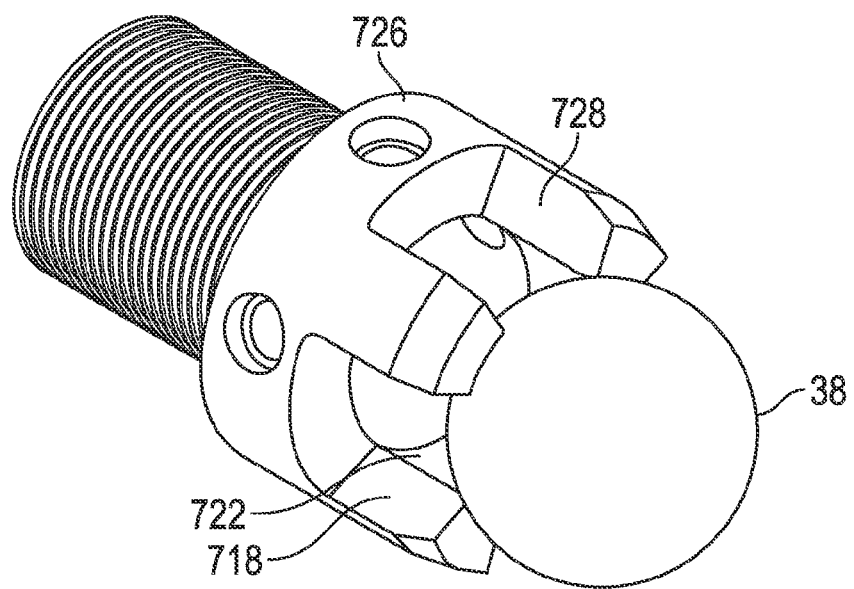
FIG. 13 depicts a perspective view of the housing of FIG. 12.

The housing 726 is shown in FIGS. 12 and 13 with one of the plugs 38 seated thereagainst. The openings 722 are formed between protrusions 728 that define the castellations 718. As with the openings 622, the total flow area of the openings 722 is set to be equal to or greater than the area of the bore 630 again to reduce pressure drops generated when fluid flows through the openings 722. Optionally, the housing 716 can employ the openings 622 in addition to the openings 722 if additional flow area is desired. The seat 710 formed by the castellations 718 locates the plug 38 substantially centrally within the structure 240 in a manner similar to that of the seat 614.

Figure 14:
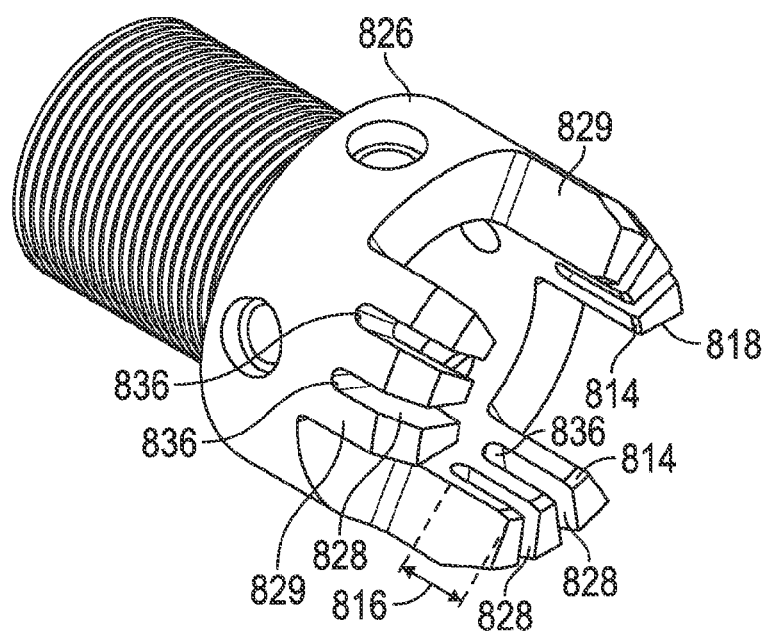
FIG. 14 depicts a perspective view of an alternate housing disclosed herein.

Referring to FIG. 14, an alternate embodiment of a housing 826 to that of housing 726 is illustrated without a plug 38 seated at a seat 814 thereon for purposes of aiding visualization. The housing 826 has castellations 818 with protrusions 829 that differ from the castellations 718 of the housing 726. The castellations 826 include slits 828 that extend radially through and longitudinally from the seat 814 a selected depth 816 therein. The purpose for these slits 828 is to control a maximum size of any debris left when one of the systems 210 is machined for removal from the structure 240.

To understand how these slits 828 accomplish this it is first necessary to know that a feature of all of the housings 726, 826 with castellations disclosed herein is that they are configured to be engagable with castellations 832 located on an opposing longitudinal end of the system 710 (FIG. 11), for example. When a plurality of the systems 710 are positioned within the structure 240 and, although not necessary, there may be times when their removal from the structure 240 by machining such as drilling or milling, for example, is desired. Each of the systems 710 is rotationally fixed to the structure 240 by the slips 224, for example. However, the castellations 718, 818 are positioned beyond the slips 224, such that the slips 224 would be machined, thereby unfixing the system 710 from the structure 240, before the housing 726, 826 is completely machined. At this point the housing 726, 826 is free to rotate relative to the structure 240. Engagement of the castellations 832 of one of the systems 710 with the castellations 718, 818 of another of the systems 710 that is longitudinally adjacent thereto prevents rotation of the housing 726, 826 while it is being machined. This rotational lock is maintained until the machining has reached lands 836 defined by the slits 828, after which only the protrusions 728, 829 of the castellations 718, 818 remain and are dislodged from the castellation 832 at which point they are considered debris and are free to move about within the structure 240. Thus, the addition of the slits 828 reduces the size of debris left from the housing 726, 826 after the system 710 is removed from the structure 240 via machining.

Figure 15:
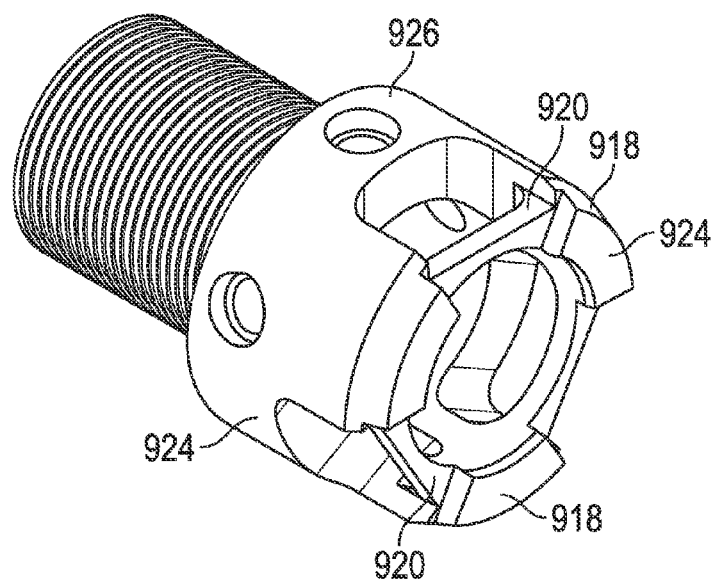
FIG. 15 depicts a perspective view of another alternate housing disclosed herein.

Referring to FIG. 15, an alternate embodiment of a housing 926 to that of housing 826 is illustrated. The housing 926 includes castellations 918 for the same purpose as the castellations 718 and 818 were employed. The castellations 918 differ in that they employ webs 920 between protrusions 924 that define the castellations 918. When the housing 926 is machined the webs 920 hold the protrusions 924 engaged with the castellations 832 while a larger proportion of the protrusions 924 are machined before disengagement with the castellations 832 occur. Size of debris remaining after removing the housing 926 from the structure 240 by machining is defined by the portion of the protrusions 924 that extend beyond the webs 920.

Figure 16:
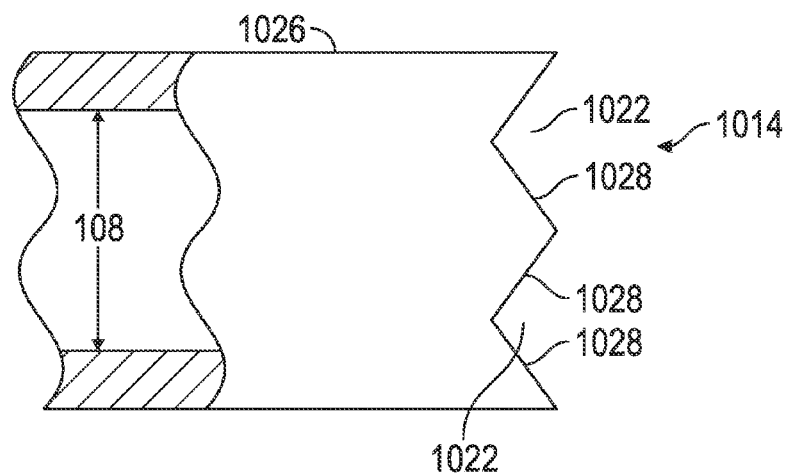
FIG. 16 depicts a partial side view of another alternate housing disclosed herein.

Referring to FIG. 16, an alternate embodiment of a housing 1026 defining openings 1022 with different shapes than the openings 622 and 722 disclosed above is illustrated. The openings 1022 are formed by a plurality of facetted surfaces 1028 that define a seat 1014 receptive to the plug 38 (see FIG. 12). The facetted surfaces are configured to locate the plug 38 centrally relative to the structure 240, for example, while defining the openings 1022. As with other embodiments disclosed herein the total flow area of the openings 1022 while the plug 38 is seated thereagainst is at least as large as the area of the bore 108 extending longitudinally therethrough. The facetted surfaces 1028 can be oriented symmetrically about the perimeter of the housing 1026 or can be asymmetrical having apparently random angles relative to one another.

Figure 17:
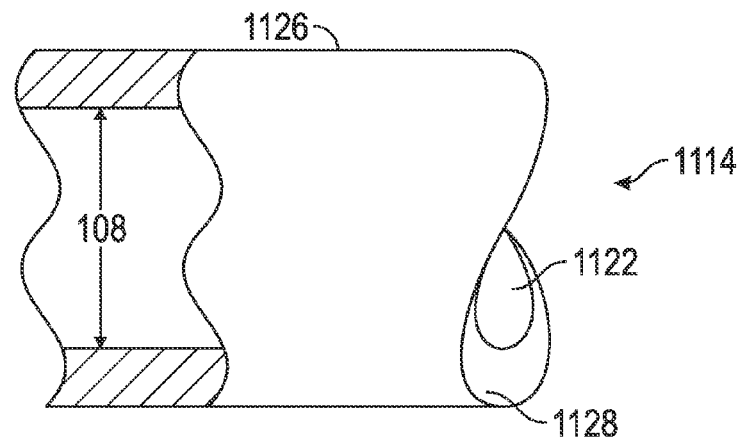
FIG. 17 depicts a partial side view of another alternate housing disclosed herein.

Referring to FIG. 17, another alternate embodiment of a housing 1126 defining openings 1122 with different shapes than the openings 622, 722 and 1022 disclosed above is illustrated. The openings 1122 are formed by undulating surfaces 1128 that define a seat 1114 receptive to the plug 38 (see FIG. 12). The undulating surfaces 1128 can be sinusoidal with respect to a plane orthogonal to a longitudinal axis of the housing 1126 or can be non-sinusoidal thereby creating different flow areas between the various individual openings 1122. Regardless of the shape of the undulating surfaces 1128 the total flow area defined by the openings 1122 when the plug 38 is seated thereagainst is at least as large as the flow area defined by the bore 108 through the housing 1126.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A one-way flowable anchoring system comprising:
    a plurality of same anchors being sealedly fixedly engagable within a structure and each of the plurality of same anchors having a flow bore longitudinally therethrough with a first seat and a second seat on opposing ends thereof; and
    a plug positionable within the structure between two of the plurality of same anchors positioned longitudinally adjacent one another, the plug being sealedly engagable to substantially block flow through the flow bore of a first of the plurality of same anchors when sealingly engaged with the first seat thereof and the plug being seatingly engagable to allow flow around the plug and into the flow bore of the second of the plurality of same anchors through an area at least equal to that of the flow bore when the plug is seated at the second seat thereof.

2. The one-way flowable anchoring system of claim 1, wherein the plug is a sphere.

3. The one-way flowable anchoring system of claim 1, wherein the plurality of same anchors are configured to locate the plug substantially centrally within the structure when the plug is seatingly engaged with the second seat.

4. The one-way flowable anchoring system of claim 1, wherein the second seat is castellated.

5. The one-way flowable anchoring system of claim 4, wherein the first seat is castellated such that castellations of the first seat of one of the plurality of same anchors rotationally lock with castellations of the second seat of another of the plurality of same anchors.

6. The one-way flowable anchoring system of claim 4, wherein webbing attaches the castellations of the second seat together.

7. The one-way flowable anchoring system of claim 4, wherein protrusions of the castellations include longitudinal slits to control sizes of pieces of the castellations that remain after the anchor has been milled in a direction from the first seat toward the second seat.

8. The one-way flowable anchoring system of claim 1, wherein the plug is sealedly engagable with the second seat.

9. The one-way flowable anchoring system of claim 8, wherein openings fluidically connect the flow bore to an outside of the second seat.

10. The one-way flowable anchoring system of claim 9, wherein the openings are oriented radially.

11. The one-way flowable anchoring system of claim 9, wherein the openings are holes.

12. The one-way flowable anchoring system of claim 9, wherein each of the plurality of same anchors comprises:
    a frustoconical member having a first frustoconical portion and a second frustoconical portion, the first frustoconical portion being tapered in a direction opposing a direction of taper of the second frustoconical portion;
    slips in operable communication with the first frustoconical portion being radially expandable in response to longitudinal movement of the first frustoconical portion relative to the slips; and
    a seal in operable communication with the second frustoconical portion being radially expandable in response to longitudinal movement of the second frustoconical portion relative to the seal.

13. The one-way flowable anchoring system of claim 1, wherein the second seat is formed by facetted surfaces.

14. The one-way flowable anchoring system of claim 1, wherein the second seat is formed by undulating surfaces.

15. A method of treating and producing a well, comprising:
    pressuring up against a first plug sealingly engaged at a first seat of a first anchor sealingly attached within a structure;
    treating the well;
    pressuring up against a second plug sealingly engaged at a first seat of a second anchor dimensioned the same as the first anchor and sealingly attached within the structure;
    treating the well;
    seating the first plug against a second seat of the second anchor; and
    flowing fluid around the second plug through openings and through a bore in the second anchor, wherein the flow area through the openings is at least as large as the flow area of the bore.

16. The method of treating and producing a well of claim 15, further comprising flowing fluid radially though the openings.

17. The method of treating and producing a well of claim 15, further comprising locating the first plug substantially centrally within the structure when the plug is seated against the second seat.

18. The method of treating and producing a well of claim 15, further comprising sealing the first plug with the second seat when seated thereat.

19. The method of treating and producing a well of claim 15, wherein the treating the well is fracing the well.

20. The method of treating and producing a well of claim 15, further comprising flowing through the openings with no more drop in pressure than flowing through the bore.

* * * * *